United States Patent
Lo et al.

(10) Patent No.: US 6,950,677 B2
(45) Date of Patent: Sep. 27, 2005

(54) WIRELESS TRANSMISSION SYSTEM

(75) Inventors: Jeffrey Lo, Taipei (TW); Joe Chang, Taipei (TW)

(73) Assignee: Inventec Corporation, Taipei (TW)

( * ) Notice: Subject to any disclaimer, the term of this patent is extended or adjusted under 35 U.S.C. 154(b) by 657 days.

(21) Appl. No.: 09/986,935

(22) Filed: Nov. 13, 2001

(65) Prior Publication Data

US 2003/0092457 A1 May 15, 2003

(51) Int. Cl.$^7$ ................................................. H04Q 7/20
(52) U.S. Cl. .................... 455/557; 455/556.2; 455/41.3
(58) Field of Search ............................. 455/517, 41.2, 455/41.3, 556.1, 556.2, 557; 370/386; 709/232

(56) References Cited

U.S. PATENT DOCUMENTS

| | | | |
|---|---|---|---|
| 6,745,047 B1 * | 6/2004 | Karstens et al. | 455/556.1 |
| 2002/0031120 A1 * | 3/2002 | Rakib | 370/386 |
| 2002/0087710 A1 * | 7/2002 | Aiken et al. | 709/232 |

* cited by examiner

Primary Examiner—Nay Maung
Assistant Examiner—Philip J. Sobutka

(57) ABSTRACT

This invention relates to a wireless transmission system, more particularly, to a wireless transmission system, which is used in the foundation. The present invention uses the first wireless network interface, which is assembled in the mobile computer and the second wireless network interface, a microprocessor, and a bridge that is assembled in the foundation to transmit signals. The signals can be transmitted between the mobile computer and the foundation by using the first wireless network interface and the second wireless network interface. The bridge is used to collect the addresses and the signals, which are transmitted from the devices that are connected with the foundation. These addresses and the signals will be transformed to become the wireless signals by using the microprocessor. Then the wireless signals are transmitted to the second wireless network interface and are sent to the first wireless network interface to make the mobile computer control the devices, which are connected with the foundation, by using wireless controlling.

12 Claims, 2 Drawing Sheets

WIRELESS TRANSMISSION SYSTEM

BACKGROUND OF THE INVENTION

1. Field of the Invention

This invention relates to a wireless transmission system, more particularly, to a wireless transmission system, which is used in the foundation. The present invention uses the first wireless network interface, which is assembled in a mobile computer and the second wireless network interface, a microprocessor, and a bridge which are assembled in the foundation so the mobile computer can control the devices, which are connected with the foundation, by using wireless controlling.

2. Description of the Prior Art

Computers have become indispensable tools in the present day and age. No matter if its leisure time or work, the computer plays the important role to conform to the needs of the users. The computer is also the best tool to save data or information. They can be used to classify data or information systematically by using a controlled program to retrench the waste of labor and power and to increase the efficiency of the work. The computer further reduces the time spent in searching for the users needed information by quickly using the programs to the efficiency, which is paid much attention in our present society.

Following the needs of users, the mobile computers, such as: notebook and personal digital assistant (PDA) are used in general. But in order to reduce the volume and the weight of mobile computers, the mobile computers usually reduce several devices, which are not usually used by the users. The reduced devices are assembled in the foundation to make the users use these reduced devices following the needs of the users.

Each different kind of the mobile computer has different reduced devices. Therefore, the foundations, which are used to collocate to the different mobile computers, are different, such as the dock, which is used to collocate the notebook. But the objective of using different foundations is the same to expand the functions of the mobile computer. The mobile computer, whose volume and weight are reduced, will not loose the partial functions of the desk computer by using its foundation. The mobile computer will also not cause any inconvenience or reduce the working efficiency of the users.

In general, the foundations have a peripheral component interconnect (PCI) device, integrated drive electronics (IDE) device, and a network device to connect to the outside apparatus, such as a printer, a scanner, a magnetic disk, or a modem. When the mobile computer is connected with the foundation, the mobile computer can bring its functions into full play. When the users connects the mobile computer with the foundation, the users can control the peripheral of the foundation by using the mobile computer and the mobile computer can reach the functions of the desk computer. Therefore, the connected interface between the mobile computer and the foundation is very important.

The traditional way to connect the mobile computer with the foundation is usually by a connector or a transmission line. The signals of the mobile computer are transmitted to the bridge, which is in the foundation, by using a transmission line or a connector. After the bridge, deciding the types and the address of the signals, the bridge will transmit the peripheral component interconnect device, the integrated drive electronics device, and the network device to drive the peripheral of the foundation and to complete the command, which is typed by the users from the mobile computer.

Although the volume and the weight of the traditional mobile computer has been reduced, the functions of the mobile computer comparing to the functions of the desk computer are reduced the partial functions. If the users want to make the functions of the mobile computer reach to the functions of the desk computer, the users must connect the mobile computer with the foundation. In the present technology, the traditional foundation must use the transmission line or the connector to connect with the mobile computer. This condition is very inconvenient for the users and will decrease the convenience and the mobility of the mobile computer. Therefore, using the traditional foundation and the mobile computer can not increase the working efficiency of the users and will only increase the problems the users will encounter.

There are many pins in the connector, which is used to connect the traditional foundation with the traditional mobile computer. If the pins are inserted in the wrong locations, the mobile computer can not be connected with the foundation successfully and the mobile computer and the foundation are damaged more easily. If several pins are broken, the users must pay more fees to repair the damaged pins and the cost of the users may be increased. If the users use the transmission line to connect the traditional foundation with the mobile computer, the mobile computer and the traditional foundation will not be connected with each other because the connector of the transmission line may be come off and the inner lines of the transmission line may be broken to trouble the users.

SUMMARY OF THE INVENTION

In accordance with the above-mentioned invention backgrounds, using the traditional transmission line or the connector to connect the mobile computer and the foundation will cause the inconvenience of the users and will cause damage to the hardware. The present invention provides a system to provide a more convenient interface for the users by using a wireless transmission way to connect the mobile computer with its foundation.

The second objective of this invention is to increase the efficiency of the mobile computer and the foundation by using the wireless transmission to connect the mobile computer with its foundation.

The third objective of this invention is to extend the lifetime of the mobile computer and the foundation by using the wireless transmission way to connect the mobile computer with its foundation.

The fourth objective of this invention is to reduce the rate of damages the mobile computer and foundation sustains by using the wireless transmission to connect the mobile computer with its foundation.

The fifth objective of this invention is to reduce the cost of damages the user pays by using the wireless transmission to connect the mobile computer with its foundation.

The further objective of this invention is to increase the efficiency by using the wireless transmission to connect the mobile computer with its foundation.

In accordance to the foregoing objectives, the present invention provides a system that is more convenient for the users by using a wireless transmission to connect the mobile computer with its foundation. The present invention assembles the first wireless network interface in the mobile computer and assemble the second wireless network interface, the microprocessor, and the bridge in the foundation to make the data being transmitted between the mobile computer and the foundation in the wireless transmission way. The present invention can also increase the efficiency of the users, the mobile computer, and the foundation and extend the lifetime of the mobile computer and the foundation. The present invention can further reduce the rate of damaging the mobile computer and foundation and reduce the damaged cost of the users.

BRIEF DESCRIPTION OF THE DRAWINGS

In the accompanying drawing forming a material part of this description, there is shown.

DESCRIPTION OF THE PREFERRED EMBODIMENT

Figure 1:
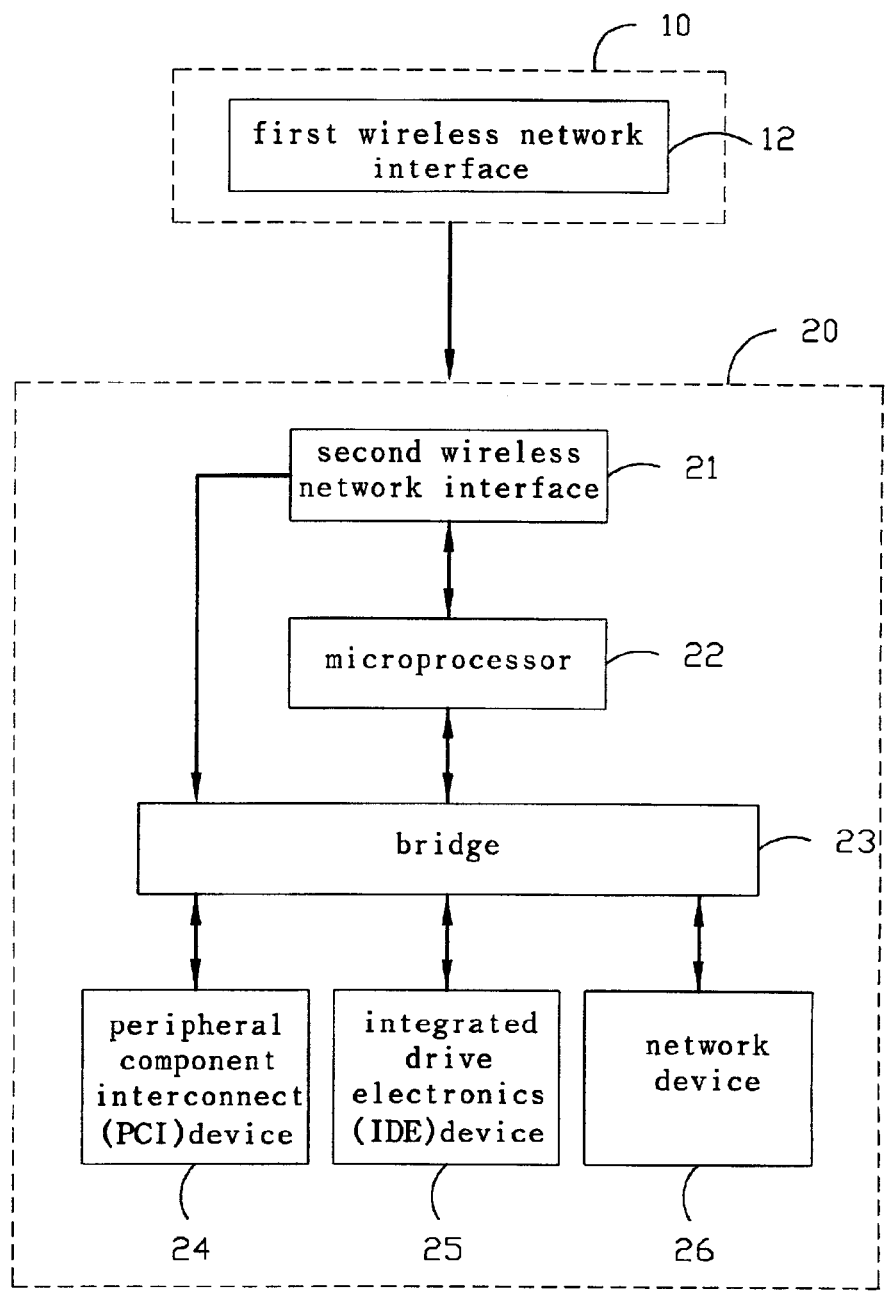
FIG. 1 shows a system diagram of the present invention.

The foregoing aspects and many of the attendant advantages of this invention will become more readily appreciated as the same becomes better understood by referring to the following detailed description, when taken in conjunction with the accompanying drawings, wherein:

Following the advancements of science and technology, the dependence of the user upon the server has become higher and higher. But the volume and weight of the desk computer has increased along with these advancements. Therefore, the desk computer is suited for a fixed location. The rate of data transmission the mobile computer can receive has become faster and allows the users to gradually get the information conveniently and quickly. In order to reduce the volume and the weight of the mobile computer, the mobile computer usually decreases partial functions of the desk computer to remove several devices and to reach the main objective of the mobile computer by reducing the volume and the weight. For the users, sometimes the partially decreased functions of the mobile computer are still to be desired. Therefore, all kinds of mobile computers have its foundation to expand the scope of the mobile computers.

However, following the kinds of the mobile computers are different, every kind of the mobile computer has its own foundation. No matter what kind of mobile computers, if the users want to connect to the mobile computer and the foundation with each other, the users must use the transmission line or connector to connect to the mobile computer with the foundation to expand the functions of the mobile computer. But these kinds of connections can decrease the convenience of the mobile computer and cause damage to the mobile computer and the foundation more easily. Therefore, the present invention must be used to connect the mobile computer and the foundation with each other by using wireless transmissions. If the mobile computer needs to be charged, the users still use the transmission line or the connector to connect the mobile computer and the foundation to get electric power.

The first wireless network interface is assembled in the mobile computer at first in the present invention to allow the mobile computer to send and receive the wireless signals. In the present invention, the standard wireless protocol of the first wireless network interface, which is in the mobile computer, is IEEE802.11; this kind wireless protocol will not limit the scope of the present invention. Then the second wireless network interface, a microprocessor, and a bridge are assembled in the foundation. In the present invention, the standard wireless protocol of the second wireless network interface, which is in the foundation, is IEEE802.11 and this kind of wireless protocol will not limit the scope of the present invention. The wireless protocol of the first wireless network interface and the wireless protocol of the second wireless network interface must be the same to send and to receive the wireless signals, which are sent from another, mutually. If the wireless protocol of the first wireless network interface and the wireless protocol of the second wireless network interface are different, the mobile computer and the foundation will not send and receive the wireless signals; which are sent from another, mutually to cause the failure in connecting with the mobile computer and the foundation. The driver of the first wireless network interface must be installed in the operating system (OS) of the mobile computer to make the mobile computer send and receive the wireless signals successfully.

If the data needs to be transmitted from the mobile computer to the foundation by using the present invented system, the data will be transformed to wireless signals by using the microprocessor, which is in the mobile computer at first. Than the wireless signals will be sent out by using the first wireless network interface, which is in the mobile computer. Within the fixed distance, after the wireless signals are sent from the mobile computer; they are received by the second wireless network interface, which is in the foundation. These wireless signals will be transmitted to the microprocessor, which is in the foundation, to be transformed by the type of the wireless signals. The objective of the microprocessor, which is assembled in the foundation, is to transform these types of signals. The microprocessor of the foundation will transform the wireless signals, which are transmitted from the second wireless network interface, to become the signals, which can be received by the devices that are assembled in the foundation or are connected with the foundation. The wireless signals are the parallel signals and the signals that can be received by the devices that are assembled in the foundation or are connected to the foundation, are the serial signals in general. Therefore the microprocessor is used to transform the types of signals to make the connection from the mobile computer to the foundation simply and successfully.

After the wireless signals are transformed to become the serial signals by using the microprocessor, the serial signals are transmitted to a bridge. The objective of the bridge, which is assembled in the foundation, is to transform a computer system input/output interface to other input/output interfaces. Therefore, the bridge, which is in the foundation, can transmit a signal to an input/output interface by judging the subject matter of the signals that are sent from the mobile computer.

In general, the foundation, which is connected to the mobile computer, is connected with others peripheral devices, such as a printer, scanner, and magnetic disk to increase the efficiency of the mobile computer and bring it into full play. After the peripheral devices receive the signals, which are transmitted from the mobile computer, by the input/output interface, the peripheral devices proceed the processes suddenly and transmit the signal back. The sending of data and address of the signal are transformed to the computer system input/output interface by using the bridge and are then transmitted to the microprocessor to transform the type of signal. The microprocessor transforms the signal, which is a serial signal, to become a wireless signal, which is the parallel signal. This wireless signal will be sent by the second wireless network interface, which is in the foundation. If the first wireless network interface receives the wireless signal, which is sent to from the foundation, the wireless signal will be treated by the processor, which is in the mobile computer and will become a message to be shown on the monitor of the mobile computer. The message will tell the users the response condition of the peripheral devices, which receives the command of the users and is connected with the foundation or assembled in the foundation.

There is an electric power-saving device assembled in the foundation. When the second wireless network interface, which is in the foundation, over a period time has not received the signal, which is transmitted from the mobile computer, the power of the foundation will enter an electric power-saving state. This kind of electric power-saving state is called the "sleep state". In the sleep state, the power of the foundation is shut down automatically for the moment, but the second wireless network interface will send a wireless signal in a period time discontinuously. When the mobile computer, which is carried by the user, enters the scope of the location wireless signal, which is sent out from the foundation, the first wireless network interface will detect the signal and a message is shown on the monitor of the mobile computer only if the power of the mobile computer is in the open state. This message will tell the user that his mobile computer has detected a foundation, which is near the location of the user. When the user wants to use several functions of the foundation, the user just gives the command to the mobile computer. This command will be transformed to a wireless signal and the wireless signal will be sent by the first wireless network interface, which is in the mobile computer. When the second wireless network interface receives the wireless signal, the electric power-saving state will be closed and the power of the foundation will be opened automatically to proceed with the command of the user. The users can depend on their needs to use the peripheral devices, which are connected with the foundation or in the foundation, to complete the work quickly and conveniently. This electric power-saving device of the foundation will reduce the cost to the user.

Each foundation, which is assembled with the present system, will send out the location through a wireless signal in a period time; no matter if the foundation is in the electric power-saving state or not. The wireless signals, which are sent from different foundations and locations, will not interfere with each other. After installing the driver of the first wireless network interface in the operating system of the mobile computer, the first wireless network interface will detect the location signals, which are sent from the foundations. When the first wireless network interface detects or receives the location signals, which are sent from the foundations, the driver will show the message that express' the mobile computers detection of the foundation to be used nearest its location, on the monitor of the mobile computer. If the mobile computer detects several foundations, the mobile computer will assign the numbers to the several foundations and will show the results on the monitor of the mobile computer to provide the choices and the uses for the users.

The wireless signal has it own scope of sending. This scope will be increased or decreased following the different types of the wireless signals. Therefore, the users can choose the mobile computer and the foundation, which are produced by using the present invention system, following the different needs of the users. In general, most of the wireless transmission means that the wireless signals must be transmitted in the straight-line way. If there is an obstacle object between the wireless signal-sending end and the wireless signal-receiving end, the wireless signal will be broken easily. The wireless signals, which are used in the present invention system, have higher power to go through common domestic objects. If the mobile computer is in the scope of the wireless signals, the mobile computer can send or can receive the wireless signal and the functions of the mobile computer will not be limited to the locations of the foundation. The wireless transmission system of the present invention can also avoid damage to the mobile computer and the foundation when the users connect the mobile computer with the foundation by using the transmission line or the connector without caution. The present invention can further extend the lifetime of the mobile computer and the foundation.

Referring to FIG. 1, this shows a system diagram of the present invention. When the user types the command into the mobile computer 10, the command will be transformed to become a wireless signal and the wireless signal will be sent by the first wireless network interface 12, which is in the mobile computer 10. After the second wireless network interface 21, which is in the foundation 20, receiving the wireless signal, the wireless signal will be transformed to become a signal, which can be received for the devices that are connected with the foundation 20, by a microprocessor 22. Then the transformed signal will be transmitted into a bridge 23. The bridge 23 will transmit the transformed signal to the devices, such as the peripheral component interconnect device 24, the integrated drive electronics device 25, and a network device 26, which are wanted for the user to use, according to the designated location of the transformed signal. After the devices receive the transformed signal from the bridge 23, the devices will send as a returned signal so that the users understand the dealing conditions. The returned signal is transmitted passing through the bridge 23 to the microprocessor 23 to be transformed to a wireless signal. Using the second wireless network interface 21, which is in the foundation 20, will send the wireless signal. When the first wireless network interface 12, which is in the mobile computer 10, receives the wireless signal, the wireless signal will be transmitted to the processor to be treated and a message will be displayed on the monitor of the mobile computer 10. Therefore, the present invention can provide a better user's interface for the users and increase the efficiency of the users. This condition will make the mobile computer reach the main objective of personal carrying power.

Figure 2:
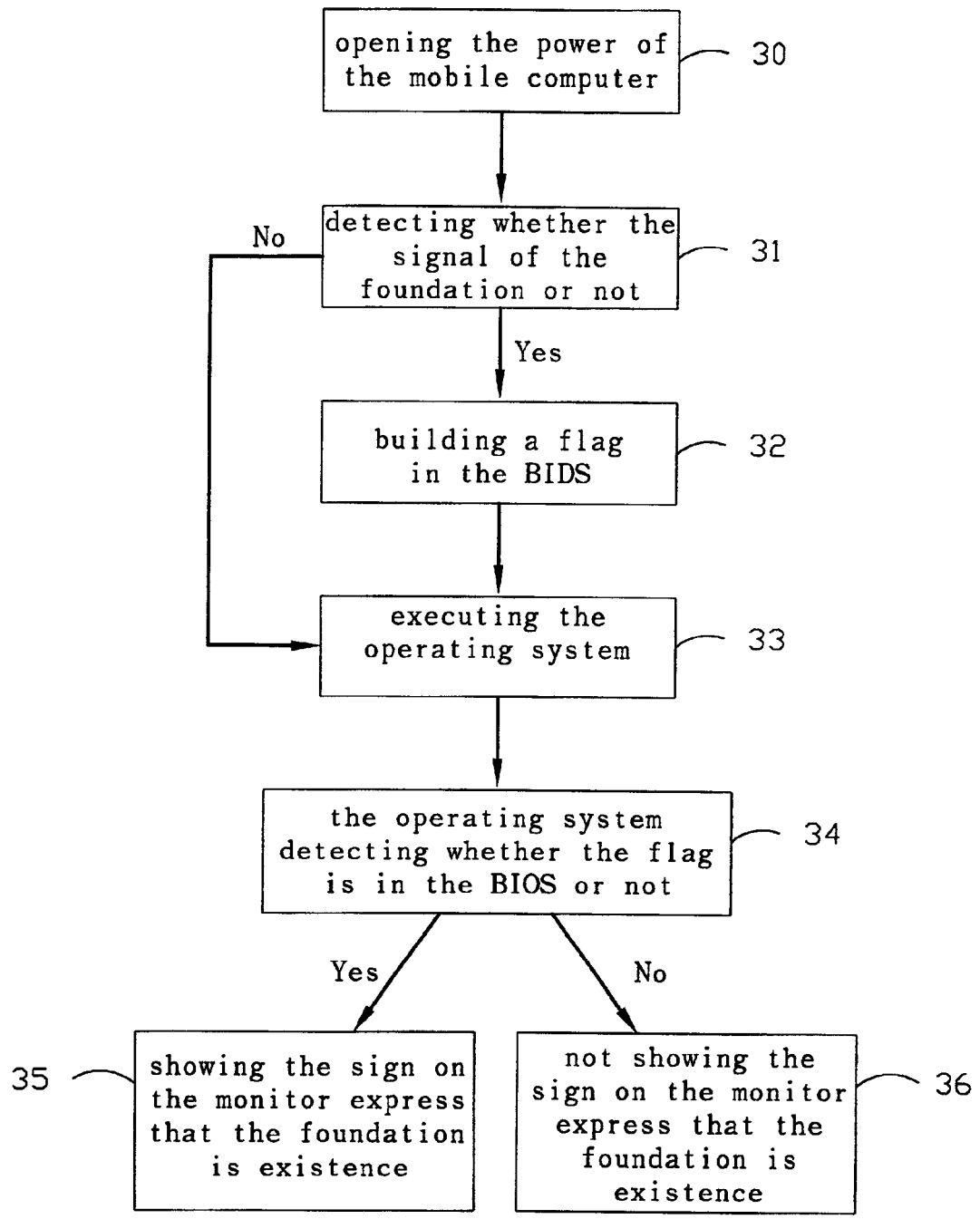
FIG. 2 shows a proceeding diagram of using the present invention system in the mobile computer.

Referring to FIG. 2, this is a proceeding diagram for using the present invention system in the mobile computer. At first a driver of the first wireless network interface is installed in the operating system of the mobile computer. After the power of the mobile computer is turned on 30, the basic input/output system (BIOS) suddenly starts to proceed. The first wireless network interface starts to detect the wireless signals location, which is sent from the second wireless network interface of the foundation 31. When the first wireless network interface detects the wireless signals location, a flag will be build in the basic input/output system 32 and then the operating system will start to execute 33. When the first wireless network interface does not detect the wireless signal location, the operating system will start to be executed 33. When the operating system of the mobile computer starts to execute, the operating system will detect the flag, which is build in the basic input/output system or not to express the mobile computer to be connected with the foundation or not 34. If the operating system has detected the flag, a sign will appear on the monitor of the mobile computer 35 to tell the users that the mobile computer is connected with the foundation. If the operating system has not detected the flag, the sign will not appeare on the monitor of the mobile computer 36 to tell the users that the mobile computer is still not connected with the foundation.

In accordance with the present invention, the present invention provides a system to provide the more convenient using interface for the users by using a wireless transmission to connect the mobile computer with its foundation. The present invention assemble the first wireless network interface in the mobile computer and assemble the second wireless network interface, the microprocessor, and the bridge in the foundation to make the data being transmitted between the mobile computer and the foundation in the wireless transmission. The present invention can also increase the efficiency of the users, the mobile computer, and the foundation and extend the lifetime of the mobile computer and the foundation. The present invention can further reduce the rate of damaging the mobile computer and foundation and reduce the damaged cost of the users.

Although specific embodiments have been illustrated and described, it will be obvious to those skilled in the art that various modifications may be made without departing from what is intended to be limited solely by the appended claims.

What is claimed is:

1. A method of a wireless transmission, wherein said method comprises:
   transmitting a first signal to a first wireless network interface and sending said first signal by using said first wireless network interface;
   receiving said first signal by using a second wireless network interface and transmitting said first signal to a microprocessor;
   transforming said first signal to become a second signal and transmitting said second signal to a bridge;
   transmitting said second signal from said bridge to a device;
   sending a third signal from said device and transmitting said third signal to said bridge;
   transmitting said third signal from said bridge to said microprocessor;
   transforming said third signal to become a fourth signal and transmitting said fourth signal to said second wireless network interface;
   sending said fourth signal; and
   receiving said fourth signal by using said first wireless network interface.

2. The method according to claim 1, wherein said first signal is a wireless signal.

3. The method according to claim 1, wherein said fourth signal is a wireless signal.

4. The method according to claim 1, wherein said first wireless network interface is located in a mobile computer.

5. The method according to claim 1, wherein said second wireless network interface is located in a foundation.

6. A method of a wireless transmission, wherein said method comprises:
   opening a power of a mobile computer;
   detecting a wireless signal which is sent out form a foundation;
   building a flag in a basic input/output system of said mobile computer;
   executing an operating system of said mobile computer;
   detecting said flag;
   showing a sign on a monitor of said mobile computer;
   transmitting a first signal to a first wireless network interface and sending said first signal by using said first wireless network interface;
   receiving said first signal by using a second wireless network interface and transmitting said first signal to a microprocessor;
   transforming said first signal to become a second signal and transmitting said second signal to a bridge;
   transmitting said second signal from said bridge to a device;
   sending a third signal from said device and transmitting said third signal to said bridge;
   transmitting said third signal from said bridge to said microprocessor;
   transforming said third signal to become a fourth signal and transmitting said fourth signal to said second wireless network interface;
   sending said fourth signal; and
   receiving said fourth signal by using said first wireless network interface.

7. The method according to claim 6, wherein said first signal is a wireless signal.

8. The method according to claim 6, wherein said fourth signal is a wireless signal.

9. The method according to claim 6, wherein said microprocessor is located in said foundation.

10. The method according to claim 6, wherein said bridge is located in said foundation.

11. The method according to claim 6, wherein said operating system comprises a driver, which can drive said first wireless network interface.

12. The system according to claim 6, wherein a protocol of said first wireless network interface and a protocol of said second wireless network interface are the same.

* * * * *